May 28, 1946.    T. SIMPSON    2,401,197
SERVOMOTOR
Filed Aug. 29, 1944    3 Sheets-Sheet 1

May 28, 1946. T. SIMPSON 2,401,197
SERVOMOTOR
Filed Aug. 29, 1944 3 Sheets-Sheet 3

Inventor
Thomas Simpson
By Mason, Nolte, Bennet Berry
Attorneys

Patented May 28, 1946

2,401,197

UNITED STATES PATENT OFFICE 2,401,197

SERVOMOTOR

Thomas Simpson, Kenilworth, England, assignor to H. M. Hobson (Aircraft & Motor) Components Limited, London, England Application August 29, 1944, Serial No. 551,672
In Great Britain March 2, 1944

8 Claims. (Cl. 121—38)

In application of S. V. Maddox, Serial No. 551,706, is described an hydraulic servomotor, in which the servo piston is moved to one or other of two alternative end positions under the control of an operating valve actuated by a pressure-sensitive device, and which includes a rotary shuttle valve, interposed between the operating valve and the servo piston and serving, on movement of the operating valve to a predetermined extent, to provide an unrestricted flow of pressure fluid to the servo piston, thus enabling the latter to execute a part at least of its stroke at high speed, despite the fact that the operating valve receives a small movement only from the pressure sensitive device, and, if unassisted by the shuttle valve, would only be able to provide a restricted flow of pressure fluid to the servo piston.

The object of the present invention is to provide an hydraulic servomotor, likewise having an operating valve controlled by a pressure sensitive device and in which the servo piston will be rapidly moved to at least three alternative positions in accordance with changes in the position of the operating valve.

The servomotor according to the invention comprises an operating valve controlled as to position by a pressure sensitive device, said operating valve having three alternative controlling positions, a servo piston movable under the control of the operating valve to three alternative predetermined positions corresponding each to one of the controlling positions of the operating valve, a pair of shuttle valves each movable between alternative end positions, pressure and exhaust connections to each shuttle valve which are controlled by the operating valve and arranged to be changed in sequence thereby to reverse one of the shuttle valves on movment of the operating valve from its first to its second position and thereafter to reverse the other shuttle valve on continued movement of the operating valve from its second to its third position, and conduits controlled by the shuttle valves according to their position to provide three alternative restriction-free connections between the servo cylinder and pressure and exhaust, whereby, on movement of the operating valve into any of its three controlling positions the servo piston is moved to the corresponding predetermined position and maintained there until the operating valve has been moved into another controlling position.

Figure 1:
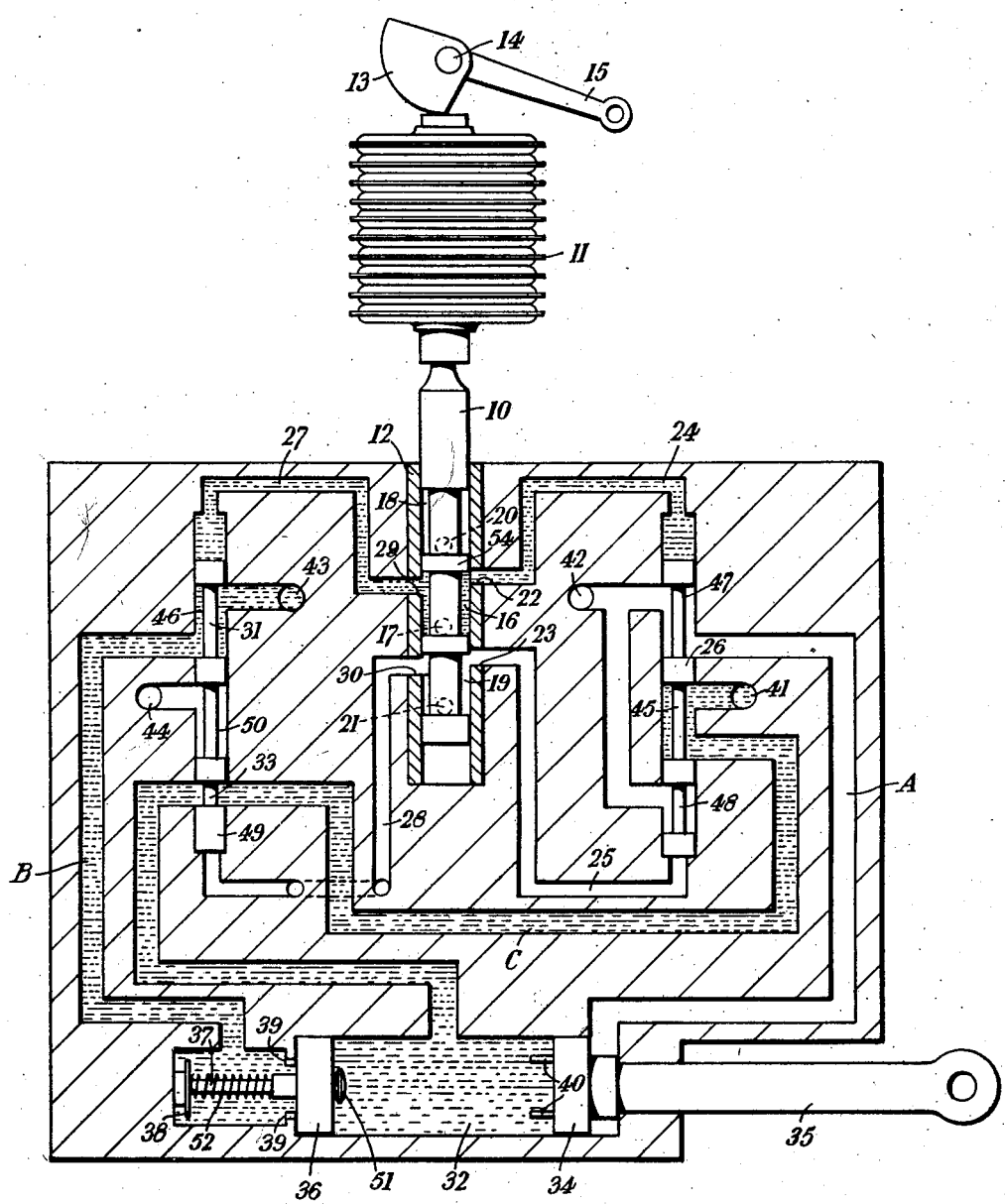
Figure 2:
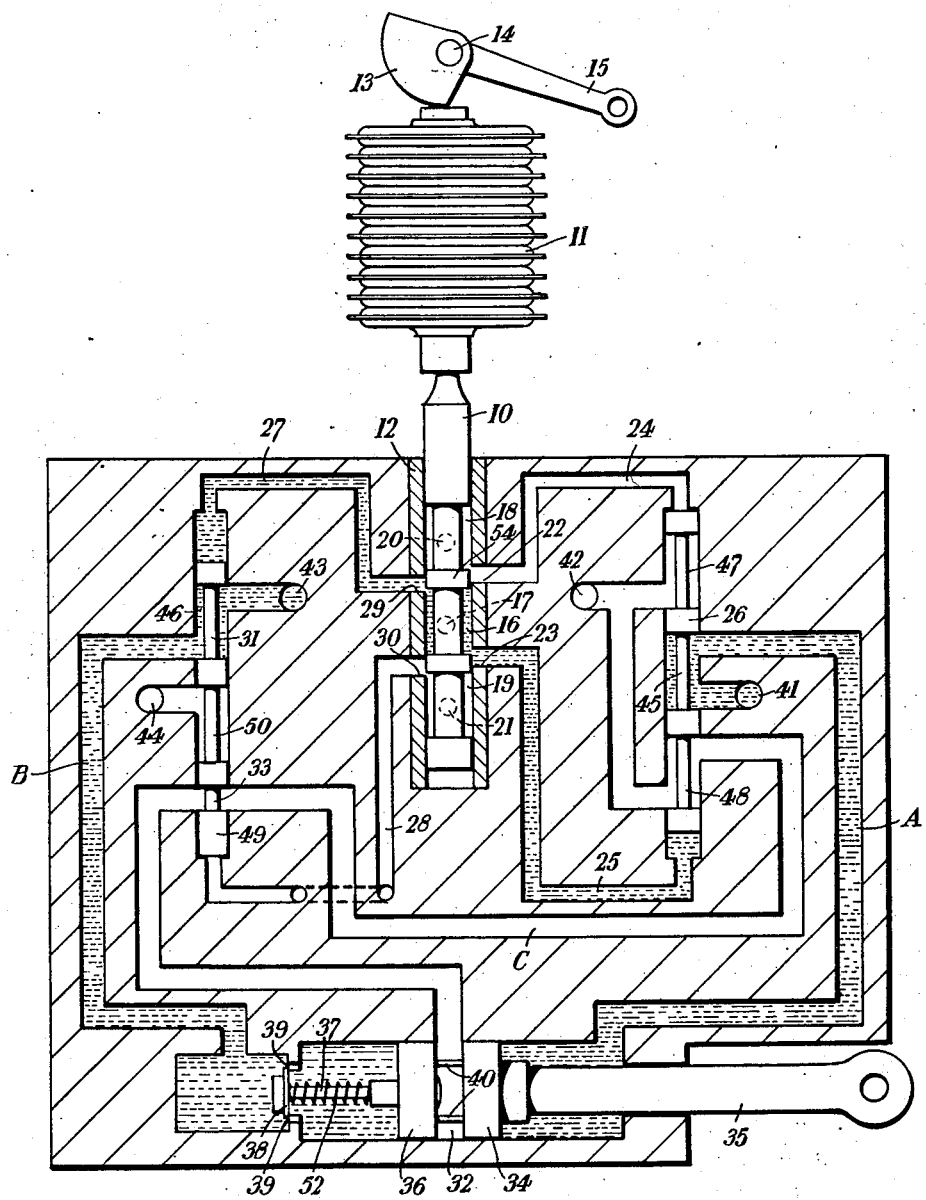
Figure 3:
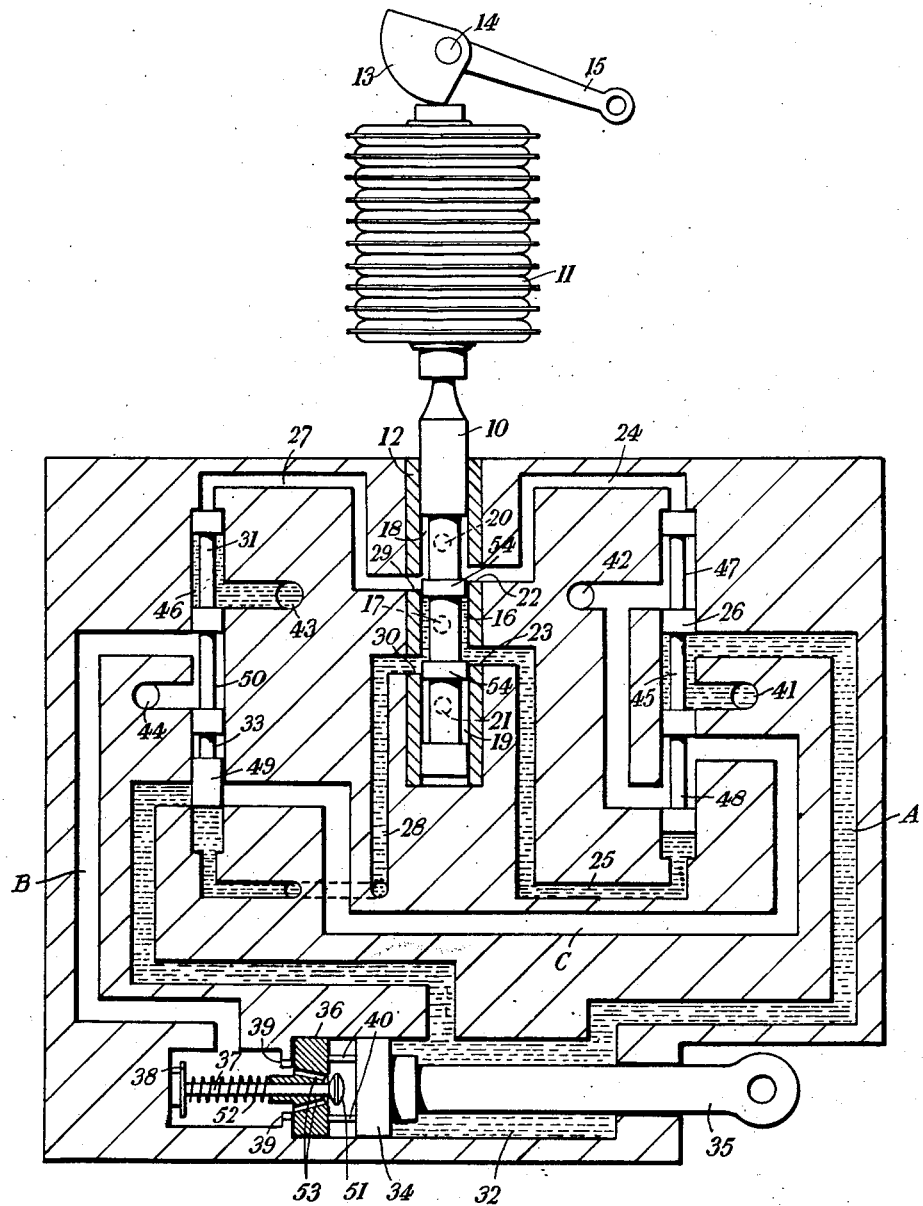

The servomotor according to the invention is of useful application for changing the gear ratio of a three-stage supercharger for an aircraft engine, and one specific embodiment of servomotor for this purpose will now be described in detail, by way of example, with reference to the accompanying drawings, in which, Figs 1, 2 and 3 are diagrammatic sections through the servomotor showing respectively the positions occupied by the parts when the servo piston is in its first, second and third predetermined positions, corresponding respectively to low, medium and high gear of the supercharger. To facilitate the understanding of the invention those conduits which are connected to pressure are shown, in each figure, shaded in chain-dots, while those which are connected to exhaust are unshaded.

The operating valve 10, which is a piston valve of the two-land type, is connected to a stack of capsules 11 exposed to atmospheric pressure, and its axial position in its sleeve 12 is consequently a function of altitude. The valve 10 has three alternative controlling positions, shown respectively in Figs. 1, 2 and 3, and movement of the valve under the control of the capsule stack into any of these positions causes the servo piston 34 to be moved into a corresponding position and to remain there until the valve has moved into another controlling position, The altitudes at which changes in the gear ratio of the supercharger will be effected, as hereinafter described, are however made dependent on prevailing conditions of boost and engine speed, as described in application Serial No. 551,706, by a variable datum cam 13. This is rotated about an axis 14, by an arm 15 coupled to the pilot's lever (not shown) which determines boost and speed, to effect the required changes in the datum of the capsule stack.

In all positions of the operating valve 10, the space 16 between the lands 54 is connected to a pressure oil inlet 17 and the spaces 18, 19 above and below the upper and lower lands are connected to exhaust outlets 20, 21 respectively.

Leading from ports 22, 23 in the right hand side of the sleeve 12, are conduits 24, 25 leading to opposite ends of a first piston-type shuttle valve 26, and similar conduits 27, 28 lead from ports 29, 30 in the left hand side of the sleeve to opposite ends of a second piston-type shuttle valve 31. The right hand ports 22, 23 are located slightly above the corresponding left hand ports 29, 30 respectively, the difference in level representing the difference in the heights at which the two change overs are to take place.

At low altitudes, at which the supercharger is required to run in low gear, the operating valve 10 is in its first controlling position near the top of its sleeve 12 as shown in Fig. 1 and the conduits 24, 27 communicating with the upper ends of the shuttle valves 26, 31 are both connected to pressure, via the central waisted portion 16 of the piston valve, while the conduits 25, 28 communicating with the lower ends of the shuttle valves are connected to exhaust, via the space 19 below the lower land of the piston valve. Both shuttle valves are thus in the down position as illustrated.

The shuttle valves control three conduits A, B, C, leading to the servo cylinder 32. Of these, conduit A leads direct from the first shuttle valve 26 to the right hand end of the cylinder. Conduit B leads direct from the second shuttle valve 31 to the left hand end of the cylinder. Conduit C leads from the first shuttle valve 26, via a waisted portion 33 of the second shuttle valve, to the centre of the cylinder.

In the servo cylinder 32 are located two pistons, viz. the servo piston 34, the piston rod 35 of which is coupled to means (not shown) for altering the gear ratio of the supercharger, and a second piston 36 on the piston rod 37 of which is carried a flange 38, which cooperates with a stop face 39 to limit inward movement of the piston 36. The servo piston 34 carries forwardly projecting stops 40.

The first shuttle valve 26 serves to effect alternative connections between conduits A and C and a pressure inlet 41 and an exhaust outlet 42. The second shuttle valve 31 serves to effect alternative connections between conduit B and a pressure inlet 43 and an exhaust outlet 44. It also serves to open or close conduit C.

With both shuttle valves in the down position, as shown in Fig. 1, an unrestricted flow of pressure oil is provided to the centre of the servo cylinder from the inlet 41, waisted portion 45 of the first shuttle valve 26, conduit C and waisted portion 33 of the second shuttle valve 31. An unrestricted flow of pressure oil to the left hand end of the cylinder is provided from the inlet 43, via the waisted portion 46 of the second shuttle valve 31 and conduit B. Unrestricted flow to exhaust from the right hand end of the cylinder is provided via conduit A, waisted portion 47 of the first shuttle valve 26 and outlet 42. The two pistons 34, 36 are thus at opposite ends of the cylinder, the piston 36 being maintained at the left hand end of the cylinder and in sealing engagement with shoulder 39 by virtue of the greater area exposed to pressure at its right hand side. This is the first predetermined position of the servo piston 34 and corresponds to low gear of the supercharger.

When an altitude is reached which necessitates change from first to second speed, the movement of the piston valve 10, by expansion of the capsule stack 11, into its second controlling position shown in Fig. 2, is effective to reverse the pressure and exhaust connections to the first shuttle valve 26, the port 22 and conduit 24 now being connected to exhaust via the space 18 and the port 23 and conduit 25 being connected to pressure via the space 16 as shown. The ports 29, 30 leading to the second shuttle valve 31 are not at this stage affected being staggered relatively to those leading to the first shuttle valve as already described. Despite the restricted flow through the ports 23, 22, the first shuttle valve 26 moves rapidly into the up position as shown, connecting conduit A to the pressure inlet 41 via its waisted portion 45 and conduit C to the exhaust outlet 42 via its waisted portion 48.

Conduit B remains connected to pressure, the second shuttle valve 31 not having moved.

Unrestricted flow of pressure oil to the right hand end of the cylinder is thus afforded through conduit A and unrestricted escape of oil from between the pistons by conduit C. The second piston 36 in the servo cylinder therefore moves in to the limit prescribed by the stop face 39, as shown in Fig. 2, and the servo piston 34 moves in until stopped by the stops 40 on it contacting with the second piston 36. The stops hold the pistons apart at a position such that the conduit C remains connected to the space between the two pistons. The cross section of the piston rod 37 of the second piston 36 is less than that of the piston rod 35 of the servo piston 34, thus the second piston has a larger effective area and is able to prevent further inward movement of the servo piston 34. In this its second predetermined position the servo piston 34 has altered the supercharger speed from low to medium.

On further increase in altitude the continued downward movement of the operating valve 10 into its third controlling position shown in Fig. 3 reverses the connections to the second shuttle valve 31. Conduit 27 and port 29 are now connected to exhaust via the space 18 and conduit 28 and port 30 to pressure via the space 16. The second shuttle valve 31 therefore moves rapidly up, blanking off the conduit C by means of its land 49 and connecting conduit B to exhaust as shown. Unrestricted flow to the exhaust outlet 44 from conduit B is permitted via the waisted portion 50 of the shuttle valve. Conduit A remains open to pressure, and the servo piston 34 moves further to the left carrying the second piston with it until the latter reaches the left hand end of the cylinder. The servo piston 34 is then in its third predetermined position and the supercharger is in high gear. In this position a relief valve 51 in the second piston is held open, as shown, against the action of its spring 52 allowing any pressure oil which may leak past the servo piston to escape to exhaust through channels 53 in the second piston. Spring 52 maintains valve 51 closed when piston 36 moves away from the end of the cylinder 32.

Obviously the reverse sequence of operations will take place as the altitude decreases. The system ensures rapid operation of the servo piston so that clutch burning will not occur. This rapid movement is attained by the use of shuttle valves of small volumetric displacement which are operated by the capsule servo valve 10. Thus, very small movements of the capsule valve 10 will result via the shuttle valves, in large quantities of oil being displaced in short periods at the main servo piston.

As will be readily understood, the width of overlap on the lands 54 of the operating valve in relation to the ports in the sleeve 12 will determine the hysteresis of the gear change. The lands 54 will be made of sufficient width to prevent the control from hunting when the aircraft is flying at about a nominal change speed altitude.

While I have referred above to a servo piston which executes a linear movement in a servo cylinder, the invention is also applicable to servomotors in which the servo piston is constituted by a servo vane which executes a rotary movement in a suitably shaped housing.

What I claim as my invention and desire to secure by Letters Patent is:

1. An hydraulic servomotor comprising an operating valve having three alternative controlling positions, a pressure sensitive device arranged to vary the position of said operating valve, a servo cylinder, a servo piston movable under the control of said operating valve to three alternative predetermined positions in said cylinder each corresponding to one of the controlling positions of said valve, a pair of shuttle valves each movable between alternative end positions, pressure and exhaust connections to each shuttle valve which are controlled by the operating valve and arranged to be changed in sequence thereby to reverse one of the shuttle valves on movement of the operating valve from its first to its second position and thereafter to reverse the other shuttle valve on continued movement of the operating valve from its second to its third position, said shuttle valves returning to their initial positions on return of the operating valve from its third to its first position; conduits controlled by the shuttle valves according to their position to provide three alternative restriction-free connections between the servo cylinder and pressure and exhaust, and stroke limiting means cooperating with said servo piston and controlled as to position by said shuttle valves, movement of said servo piston from one to another of its predetermined positions being effected by the fluid pressure in said conduits and said stroke limiting means operating to arrest said servo piston in at least one of said positions.

2. An hydraulic servomotor comprising an operating valve, a pressure sensitive device, a servo cylinder, a servo piston contained in said servo cylinder, pressure and exhaust connections from the operating valve to each shuttle valve, conduits controlled by the shuttle valves which constitute alternatively connectable lines permitting of unrestricted flow of pressure fluid to the servo cylinder and from the servo cylinder to exhaust and serve, according to their mode of connection, to direct the servo piston to one of three predetermined positions in its cylinder, and stroke limiting means cooperating with the servo piston and responsive to the fluid pressure in said conduits; movement of the operating valve from a first controlling position, in which the servo piston is in a first position in its cylinder, to a second controlling position serving to reverse the pressure and exhaust connections to one shuttle valve and, by the resultant movement thereof, to change the pressure and exhaust relationship of the conduits so as to move the servo piston to its second position, and also to move said stroke limiting means into position to prevent movement of said servo piston beyond said second position; and further movement of the operating valve to a third controlling position serving also to reverse the pressure and exhaust connections to the second shuttle valve and, by the resultant movement thereof, again to change the pressure and exhaust relationship of the conduits so as to render said stroke limiting means inoperative and allow movement of the servo piston to its third predetermined position.

3. An hydraulic servomotor as claimed in claim 1, comprising in the cylinder at the opposite end thereof to the servo piston a second piston having a restricted stroke, the pressure and exhaust relationship of the conduits being such that in the first controlling position of the operating valve the pistons are maintained at opposite ends of the cylinder, while reversal of the first shuttle valve effects inward movement of both pistons to the limit defined by the stroke of the second piston, further inward movement of the servo piston being then prevented by the second piston, and subsequent reversal of the second shuttle valve permits continued movement of the servo piston to carry the second piston back to its end of the cylinder.

4. An hydraulic servomotor as claimed in claim 1, comprising in the servo cylinder at the opposite end thereof to the servo piston, a second piston having a restricted stroke, and in which the shuttle valves control pressure and exhaust connections to three conduits leading respectively to the centre and the two ends of the cylinder, the first shuttle valve initially, in the first controlling position of the operating valve, connecting the conduit at the servo piston end of the cylinder to exhaust and the central conduit to pressure and reversing these conduits when itself reversed, and the second shuttle valve initially connecting the other end conduit to pressure but connecting said conduit to exhaust and closing the central conduit when itself reversed, a stop being provided between the two pistons to prevent closure of the central conduit, by close abutment of the pistons, when the servo piston occupies its second predetermined position.

5. An hydraulic servomotor as claimed in claim 1, in which the operating valve is a piston valve of the two land type, and controls pairs of relatively staggered ports by which the alternative pressure and exhaust connections to the shuttle valves are established.

6. An hydraulic servomotor, comprising a servo piston, a housing for said servo piston, an operating valve having three alternative controlling positions, a pressure sensitive device arranged to move said valve from one to another of its controlling positions in response to variation in the pressure acting on said device, a pair of shuttle valves each movable between alternative end positions, connections to one shuttle valve which are interchangeably connected to pressure and exhaust to effect reversal of said shuttle valve on movement of the operating valve over the range defined by its first and second controlling positions, connections to the other shuttle valve which are interchangeably connected to pressure and exhaust to effect reversal of said other shuttle valve on movement of the operating valve over the range defined by its second and third controlling positions, three conduits communicating respectively with the end of said housing and with a point thereof intermediate its ends and controlled by the shuttle valves according to their position to provide alternative restriction-free connections between said housing and pressure and exhaust, said connections providing fluid pressure to maintain the servo piston in one end position in its housing when the operating valve is in its first controlling position and to move the servo piston towards the other end position in its housing when the operating valve is moved to its other controlling positions, and stroke limiting means controlled by the shuttle valves for arresting the servo piston in a predetermined intermediate position in its cylinder when the operating valve occupies its second controlling position.

7. A servomotor as claimed in claim 6, in which the stroke limiting means is constituted by a restricted stroke second piston located in the housing opposite the servo piston and movable under the control of the shuttle valves between an end position and an intermediate position in the housing, reversal of the first-mentioned shuttle valve by movement of the operating valve from its first to its second controlling position permitting of inward movement of said second piston to arrest the servo piston in said intermediate position, and subsequent reversal of the other shuttle valve on movement of the operating valve to its third controlling position rendering the second piston ineffective to resist continued movement of the servo piston to the end of the housing, and comprising a valve in said second piston arranged to close on inward movement of said second piston and to open when said second piston is in its end position in the housing.

8. A servomotor as claimed in claim 6, in which the operating valve is a piston valve and the pressure sensitive device is a bellows connected at one end to the piston valve, and comprising a manually operable cam arranged to bear against the other end of the bellows, operation of said cam serving to vary the pressures at which the piston valve will move from one controlling position to another.

THOMAS SIMPSON.